Aug. 14, 1928.

W. L. MORRISON

LAMP SUPPORT

Filed May 28, 1925

1,680,951

Inventor
W. L. Morrison
by W. H. Lieber
Attorney

Patented Aug. 14, 1928.

1,680,951

UNITED STATES PATENT OFFICE.

WILLARD L. MORRISON, OF MELROSE, MASSACHUSETTS.

LAMP SUPPORT.

Application filed May 28, 1925. Serial No. 33,329.

This invention relates in general to improvements in the art of illumination, and relates more specifically to improvements in the construction of supports and other accessories for electric lamps, connector plugs, or the like.

An object of the invention is to provide an improved supporting socket for electric lamps or the like, which is simple in construction and efficient in operation. Another object of the invention is to provide improved means for detachably supporting an electric lamp or plug socket and for connecting the same to a source of electrical energy. A further object of the invention is to provide an improved reflector for lamps or the like.

The ordinary low-voltage lamp socket universally used in automobile service, comprises a socket shell, a plunger associated with one of the current conductors and movable longitudinally within the shell, and a spring for urging the plunger toward the shank of a lamp disposed within the shell, to lock the lamp to the socket. These prior sockets are relatively objectionable since the springs used therein frequently become inoperative due to corrosion or breakage, thus necessitating dismantling of the socket and replacement of the spring. The present invention contemplates in part, provision of a simple and efficient method for eliminating necessity of replacing the locking springs of the prior art, and comprises provision of one or more pieces or washers of soft rubber for urging the locking plunger toward locking position. These rubber pieces besides eliminating the spring replacement nuisance, also simplify insulation difficulties and reduce the cost of construction and of maintenance of lamp sockets, to a minimum.

While it is desirable in automobiles and other vehicles, to have electric lights available at the dash boards and in other places, a great many cars are not initially equipped with dash lights and service sockets in places where the latter are most desirable. The present invention further contemplates in part, provision of simple, efficient and attractive means for detachably supporting an electric lamp or plug socket upon various parts of a machine, and especially upon the dash board of an automobile, and for connecting the socket to a source of electric current. In accordance with this feature of the invention, a socket is mounted upon a removable clamp or support having a terminal coactable directly with one of the terminals of an ammeter or the like associated with the dash board or other part of the car. In accordance with the improvement, the support may be provided with several sockets disposable at various places, and may be applied and removed by a novice.

The invention additionally contemplates provision of an improved reflector attachable directly to a standard electric lamp, whereby the light may be deflected in any desired direction. The improved reflector besides being extremely simple and compact in structure, is readily attachable and manipulable to direct the light as desired.

These and other objects and advantages of the improvement will be apparent from the following description.

A clear conception of the novel features of the invention and of the manner of constructing and of manipulating devices manufactured in accordance therewith, may be had by referring to the drawing accompanying and forming a part of this specification in which like reference characters designate the same or similar parts in the various views.

Figures 1, 2:
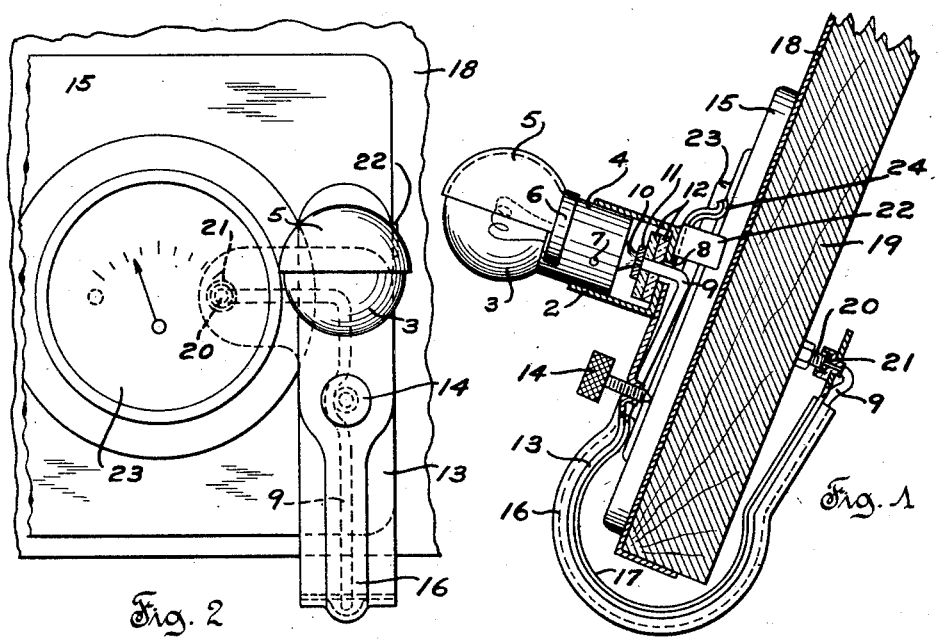
Fig. 1 is a part sectional side elevation of the improved lamp socket and of the detachable mounting means therefor, showing the same supporting an electric lamp from the dash board of an automobile.
Fig. 2 is a direct front view of the improved lamp support and of an improved deflector applied to a lamp and to a fragment of an automobile dash board.

Referring to the drawing, the improved lamp support or socket consists of a socket shell 2, 25 having a locking slot 26 in the side wall thereof and having a central hole 8 in its end; an insulated conductor or wire 9, 27 extending into the interior of the shell 2, 25 through the end hole 8; a plunger or conductor plate 11 rigidly attached as by soldering to the end of the wire 9, 27 within the shell 2, 25; and a pair of soft rubber pieces or washers 12 embracing the wire 9, 27 between the plate 11 and the rear end of the shell 2, 25. The standard low-voltage lamp 3 has a cylindrical shank 4 and a central terminal 10 insulated from the shank 4 and disposable within the shell 2, 25, and also has a laterally projecting locking pin 7 adapted to coact with the locking slot 26 of the socket shell 2, 25 when the lamp 3 is secured within the socket. The lamp 3 may have two oppositely disposed locking pins 7, in which event the shell 2, 25 would be provided with oppositely disposed locking slots 26 in an obvious manner.

The improved socket mounting means specifically illustrated in Figs. 1 and 2, comprises a resilient U-shaped clamping support 13 having an elevated bead 16 extending along the bend thereof and providing a housing for the conducting wire 9. The support 13 is preferably formed of spring metal and the ends of the support are biased toward each other in order to exert a clamping pressure upon intervening structure such as a dash board. The socket shell 2 is rigidly attached to the outer side of one end of the support 13, and the opposite side of the said support end is covered with insulating material 24 as shown. An inwardly projecting positioning and retaining lug 22 may also be formed integral with the socket supporting end of the support 13 and faced with insulation on the inner side thereof. The opposite end of the support 13 is provided with a connecting terminal cup 21 to which the end of the wire 9 is soldered or otherwise permanently attached. The intermediate beaded portion of the support 13 has an inner covering of insulation 17 which serves to retain the wire 9 within the bead 16. The portion of the support 13 adjacent to the socket shell 2 is distorted to provide a threaded opening within which the conducting set screw 14 is adjustably mounted.

Figures 3, 4, 7:
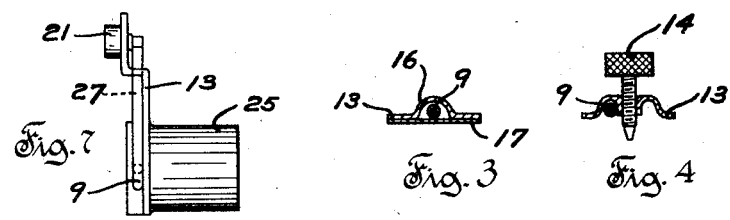
Fig. 3 is a transverse section through the beaded portion of the resilient clamping support and of the conducting wire disposed therein.
Fig. 4 is a transverse section through the resilient clamping support, the section being taken at the conductor set screw.
Fig. 7 is a side elevation of the auxiliary lamp or plug socket associated with the modified form of mounting means of Figs. 5 and 6.
Figures 5, 6:
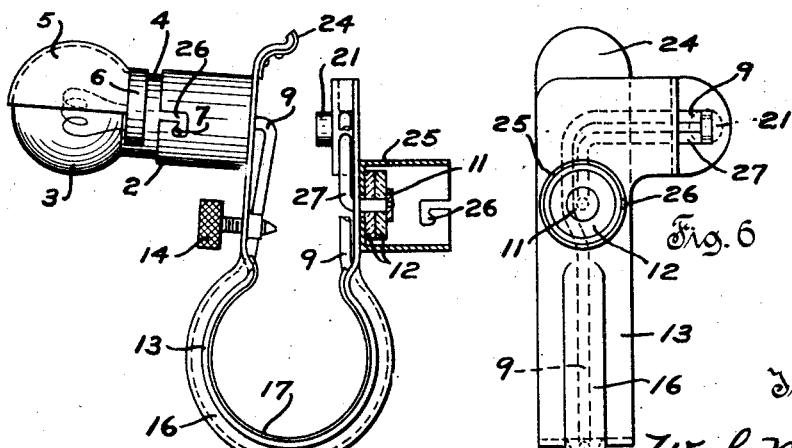
Fig. 5 is a part sectional side elevation of a modified form of the improved lamp socket and detachable mounting means therefor, showing an auxiliary socket associated with the resilient mounting means.
Fig. 6 is a rear view of the modified socket mounting means, looking directly toward the auxiliary lamp or plug socket.

The modified socket mounting means specifically illustrated in Figs. 5, 6 and 7, is substantially similar in construction to that disclosed in Figs. 1 and 2, but has an auxiliary socket shell 25 rigidly attached to the leg thereof which is disposable below the dash board. The conductor wire 27 one end of which is rigidly attached to the plunger plate 11 within the shell 25, has its opposite end rigidly attached to the terminal cup 21 as shown in Figs. 6 and 7.

The improved reflector specifically illustrated in Figs. 1, 2 and 5 comprises a reflecting hood 5 and a spring clamp 6, the former being associable with a lamp bulb as shown and being detachably held in position by the clamp 6 which embraces the lamp shank 4. While the clamp 6 exerts sufficient pressure against the shank 4 to firmly retain the reflector in place, the shield 5 may readily be shifted to any desired position about the central axis of the lamp.

The standard automobile dash board shown in Figs. 1 and 2 consists of a wooden dash board 19 disposed at an angle as shown, a sheet metal plate 18 covering the board 19 and providing a ground connection, an instrument panel 15 mounted directly upon the plate 18 and an ammeter 23 and other instruments associated directly with the panel 15. The ammeter 23 has a terminal 20 which is connected to a battery or other source of electrical energy in a well known manner.

In order to attach a lamp 3 or a standard connector plug to one of the improved sockets, it is only necessary to insert the shank 4 within the shell 2, 25 with the pins 7 in line with the slots 26. By pressing the lamp terminal 10 against the plunger 11, the rubber washers 12 are compressed slightly and it becomes possible to turn the lamp shank 4 so that the pins 7 move into locking position within the lateral extensions of the slots 26. When the pins 7 have been thus positioned, the rubber washers 12 expand slightly and firmly lock the lamp 3 within the socket. Removal of the lamp or plug may be effected in an obvious manner.

In order to detachably connect one of the resilient supports 13 to the dash board of an automobile, it is only necessary to spread the arms of the support 13 and to slip the same over the lower edge of the dash board as shown in Figs. 1 and 2. After positioning the terminal cup 21 in contact with the ammeter or other terminal 20, and properly positioning the upper socket carrying arm with the insulated face of the projection 22 in contact with the side of the instrument panel 15, the arms of the support 13 may be released and firmly lock the support in place. With the appliance thus positioned, the set screw 14 which preferably has an insulated operating head, may be screwed into contact with the surface of the instrument panel 15 as shown in Fig. 1, whereupon the electric circuit is completed and the lamp 3 is lit. With the lamp 3 thus lit, current passes from the terminals 20, 21 through the wire 9, plunger 11, terminal 10, lamp filament, shank 4, socket shell 2, support 13, and set screw 14 to the ground. By adjusting the set screw 14 to a position of disengagement with the panel 15, the circuit is broken and the lamp 3 is put out.

In the same manner, a lamp 3 may be disposed within the socket shell 25 below the dash board and operated at will, or the lamps 3 may be replaced by a service connection if desired. The support 13 may be removed by merely spreading the clamping arms thereof and withdrawing the entire appliance from the dash board. Such application, adjustment and removal of the device may obviously be accomplished by a novice.

The use of a reflector 5 is extremely desirable in connection with a lamp 3 disposed above the dash board, in order to prevent having the glare from interfering with the driver's vision. The improved reflector 5 may be adjusted to deflect the light in any desired direction and may be readily applied, adjusted and removed.

From the foregoing description, it will be apparent that the invention provides a simple, compact and efficient appliance for providing a dash or service light at the dash board or other part of a vehicle. The improved lamp socket besides being simple and compact, is suitably insulated by virtue of the rubber washers 12. The support 13 is likewise properly insulated and protected against short circuiting by the insulation 17, 24 and the exposed metal parts may obviously be nickel plated to present a neat and attractive appearance. While the device has been specifically illustrated as being especially applicable to Ford cars, the invention is obviously capable of more general application.

It should be understood that it is not desired to limit the invention to the exact details of construction herein shown and described, for various modifications within the scope of the claims may occur to persons skilled in the art.

It is claimed and desired to secure by Letters Patent:—

1. A support adapted for attachment of an electric lamp to the dash board of an automobile, comprising, a U-shaped metal support having longitudinally recessed arms resiliently biased toward each other and against the opposite sides of the dash board, a lamp socket carried by the upper end of one of said arms, a terminal carried by the upper end of the other of said arms, a conductor connecting said socket and said terminal, said conductor lying within the arm recesses and being insulated from said support, and means for grounding said support through the dash board.

2. A support adapted for attachment of an electric lamp to the dash board of an automobile, comprising, a U-shaped metal support having longitudinally recessed arms resiliently biased toward each other and against the opposite sides of the dash board, a lamp socket carried by the upper end of one of said arms, a second lamp socket carried by a medial portion of the other of said arms, a terminal carried by the upper end of said other arm, a conductor connecting said sockets and said terminal, said conductor lying within the arm recesses and being insulated from said support, and means for grounding said support through the dash board.

In testimony whereof, the signature of the inventor is affixed hereto.

WILLARD L. MORRISON.